United States Patent [19]

Wright

[11] Patent Number: 4,925,749
[45] Date of Patent: May 15, 1990

[54] ELECTROCHEMICAL CELL

[75] Inventor: Michael L. Wright, Allestree, England

[73] Assignee: Lilliwyte Societe Anonyme, Luxembourg, Luxembourg

[21] Appl. No.: 282,710

[22] Filed: Dec. 8, 1988

[30] Foreign Application Priority Data

Dec. 24, 1987 [GB] United Kingdom ................. 8730136

[51] Int. Cl.$^5$ .......................................... H01M 10/39
[52] U.S. Cl. ................................................... 429/104
[58] Field of Search .............................. 429/103, 104

[56] References Cited

U.S. PATENT DOCUMENTS

| | | | |
|---|---|---|---|
| 4,006,281 | 2/1977 | Markin et al. | 429/104 |
| 4,348,467 | 9/1982 | Wright | 429/104 |
| 4,446,213 | 5/1984 | Steinleitner | |
| 4,452,870 | 6/1984 | Langpape | |
| 4,797,332 | 1/1989 | Barrow et al. | 429/104 |

FOREIGN PATENT DOCUMENTS

| | | |
|---|---|---|
| 1461071 | 1/1977 | United Kingdom . |
| 1491929 | 11/1977 | United Kingdom . |
| 2089559A | 6/1982 | United Kingdom . |
| 2132003 | 6/1984 | United Kingdom . |
| 2140608A | 11/1984 | United Kingdom . |
| 2195329A | 4/1988 | United Kingdom . |

OTHER PUBLICATIONS

Pompon et al., "Sodium-Sulfur Accumulators for Energy Storage", Comm. European Communities Report No. EUR 9236, vol. 2, at 174-183 (1984).

Primary Examiner—Donald L. Walton
Attorney, Agent, or Firm—Arnold, White & Durkee

[57] ABSTRACT

The invention provides a rechargeable high temperature electrochemical storage cell having a molten alkali metal anode and a cathode separated from the anode by a ceramic solid electrolyte separator which is a conductor of ions of the anode. The separator has, in contact with its surface exposed to the alkali metal of the anode, a lining of material which is porous to and permeable by the molten alkali metal of the anode. The molten alkali metal of the anode, when in contact with the surface of the material of the lining, exhibits a contact angle of at least 90° with respect to the surface of the lining material.

11 Claims, 1 Drawing Sheet

U.S. Patent  May 15, 1990  4,925,749
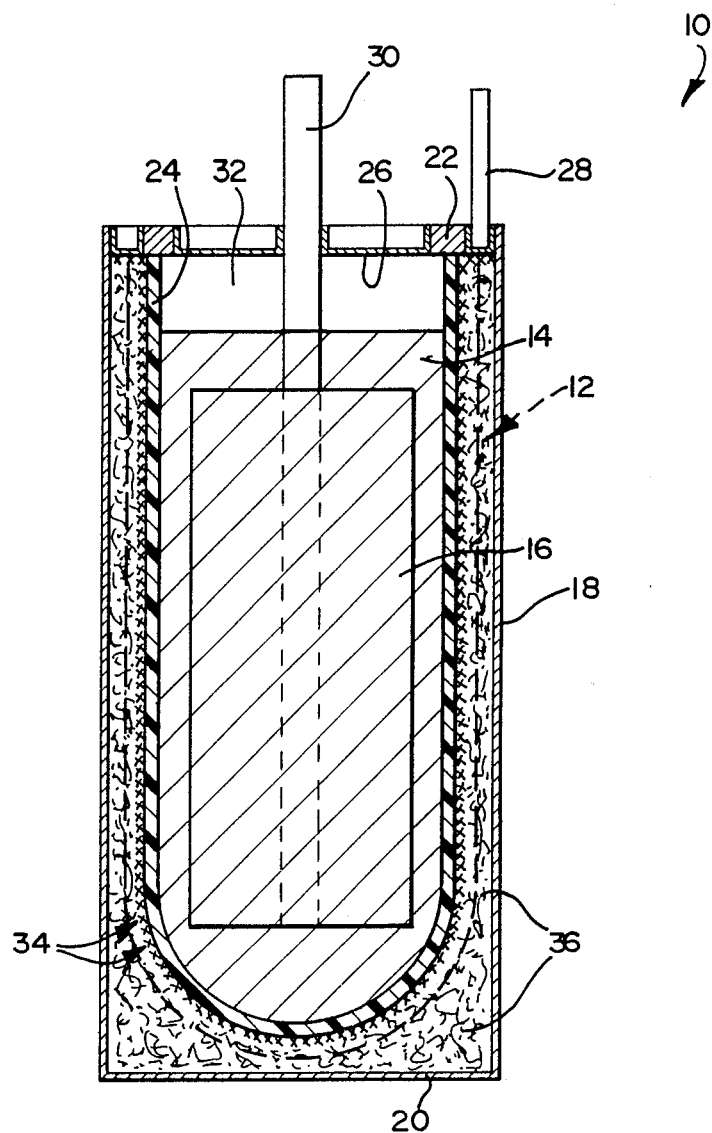

ELECTROCHEMICAL CELL

This invention relates to an electrochemical cell. More particularly the invention relates to a rechargeable high temperature electrochemical power storage cell having a molten alkali metal anode and a cathode separated from the anode by a ceramic solid electrolyte separator, and to a method of promoting reliable contact between the alkali metal of the anode and the whole surface of the separator which is exposed to said alkali metal, and reliable wetting of the whole of said surface by said alkali metal over the whole of each charge/discharge cycle of the cell.

According to the invention there is provided a rechargeable high temperature electrochemical power storage cell having a molten alkali metal anode and a cathode separated from the anode by a ceramic solid electrolyte separator which is a conductor of ions of the alkali metal, the separator having, in contact with its surface exposed to the alkali metal of the anode, a lining in the form of a material which is porous and permeable by to the molten alkali metal of the anode, the molten alkali metal of the anode, when in contact with the surface of the material of the lining, exhibiting a contact angle of at least 90° with respect to the surface of the lining material.

In other words, the lining material should be poorly wetted by the molten alkali metal of the anode, and must exhibit anti-wicking properties as described hereunder.

While the lining may in principle be a unitary artifact, for practical reasons it is contemplated that it will usually be particulate, being eg granular or fibrous in nature. When this material is particulate and volume and mass are considerations, it preferably has a high percentage porosity, eg more than 80%, preferably more than 90% and ideally above 95%; and it preferably has a low particle size, the granules or fibres thereof having a diameter of at most 500 microns, preferably less than 15 microns, and more preferably less than 5 microns, eg 0.01–3 microns. By percentage porosity is meant:

$$\text{Percentage Porosity} = \left(1 - \frac{\text{bulk density}}{\text{actual density}}\right) \times 100.$$

Thus, both these criteria are preferably met together, the lining being in the form of a layer of particulate material having a percentage porosity as defined herein of at least 80% and an average particle diameter of at most 15 microns.

Because, as described hereunder, the anode material of cells according to the invention is trapped and held captive as surface layer on the separator by the lining material which may be electrically insulating, it may be necessary to have an anode current collector in close proximity to the separator, on the anode side of the separator. For this purpose a wire mesh gauze or screen, eg of nickel, iron or steel, has been found to be suitable, the gauze or screen being permeable to the molten alkali metal of the anode and conveniently located hard up against the separator, in contact therewith at as many sites as possible. Thus, the lining material may be electronically insulating, the cell including an anode current collector in the form of a mesh or screen of electronically conducting material which is permeable to the molten alkali metal of the anode and is in face-to-face contact at a multiplicity of positions with the surface of the separator having said lining, the current collector being embedded in the material of the lining.

A further optional feature of the invention comprises, admixed with the lining material such as alpha-alumina flocks or fibres, a proportion of, say, 1–10% by mass of suitable wettable fibres such as carbon fibres treated eg with a suitable metal oxide coating to make them wettable, or transition metal fibres such as iron or nickel fibres, of more or less the same dimensions as the alpha-alumina flocks. These fibres, in addition to improving the current collecting ability of the anode, enhance physical transport of molten sodium through the alpha-alumina flocks towards and away from the beta-alumina surface, during discharging and charging respectively of the cell.

As lining materials, ceramics such as alpha-alumina have been found to be suitable. Such ceramics typically exhibit desirable high contact angles with molten alkali metals such as molten sodium, and are chemically and electrochemically inert in the anode environment, while usually being electrically non-conductive.

In one embodiment, the lining may thus be a layer of ceramic particles, the current collector being in the form of a metal mesh or screen. In this regard, the Applicant has successfully tested alpha-alumina fibre flocs of average diameter of 2 microns having a percentage porosity as defined above of 97,75%; and alpha alumina powders having an average particle size of 0.02 microns and a percentage porosity of 97%. In another embodiment, the lining may be in the form of a layer of electronically conducting particulate material, eg carbon beads, which functions as a current collector.

It is contemplated that the present invention will usually be applicable to cells in which the alkali metal of the anode is sodium, the separator being of beta-alumina, eg beta''-alumina, or nasicon. The a cathode may be sulphur (or sodium sulphide/polysulphide) or it may be in the form of an electronically conductive electrolyte-permeable matrix impregnated with liquid electrolyte, the liquid electrolyte being an alkali metal aluminium halide molten salt electrolyte such as stoichiometrically exact sodium aluminium chloride. When the cathode comprises said matrix, the matrix may have dispersed therein an active cathode substance which in its discharged state comprises at least one member of the group comprising Fe, Ni, Co, Cr, Mn, and compounds of said transition metals with at least one non-metal of the group comprising carbon, silicon, boron, nitrogen and phosphorous. This active cathode substance becomes chlorinated during charging of the cell, eg so that said metals assume the +2 valency in the charged state.

In such cells the separator is typically a beta-alumina tube, closed at one end and open at the other, located concentrically in a cylindrical housing, the anode being either inside the tube with the cathode between the tube and the housing, or between the tube and the housing with the cathode in the tube.

Thus, the anode may be located in an anode compartment which contains an inert gas under pressure, the inert gas having a pressure of at least 10 kPa, eg 10–200 kPa (0.1–2 atmospheres) when the cell is in its fully discharged state.

In each case the lining may have a volume at least sufficient to absorb, in its porous interior, all the alkali metal of the anode when the cell is in its fully charged state. Said anode metal is preferably distributed uniformly over the surface of the separator as a layer of more or less uniform thickness in contact with the separator, and the lining may similarly be of more or less uniform thickness.

The Applicant has found that when cells of the type in question (with the cathode inside a beta-alumina tube having an iron or nickel mesh sleeve anode current collector tightly wrapped around its exterior, molten sodium as the anode material, and a housing around the tube filled with alpha-alumina flock fibres of a diameter of about 2-3 microns and a bulk density of about 0.89 g/cm$^3$, ie a percentage porosity of 97.75%, bearing in mind that alumina has an actual density of 3.97 g/cm$^3$) are loaded in a fully discharged state, with no anode material in the anode compartment between the tube and housing, and these cells are then charged, sodium passes outwardly through the tube in ionic form, emerging from the separator into contact with anode current collector from which it receives electrons to form molten sodium metal. This sodium metal is held by the alumina fibres lining the tube, in the form of a layer of more or less uniform thickness, in contact with the tube, filling the pores between the fibres adjacent the tube. Similar results are obtained when the flock fibres and current collector are replaced by carbon beads, and carbon beads of sizes in the range as high as 50-350 microns have been found to be effective, indicating that smaller-size carbon particles, eg powders or fibres of less than 15 micron diameter size, will be even more effective.

The Applicant has found no significant tendency for the molten sodium to drain downwardly under gravity, even with tubes of substantial length and oriented vertically. As the cell is charged the layer of molten sodium on the anode side of the tube merely becomes thicker, and if the cell is subsequently discharged, the layer simply becomes thinner. Without being bound by theory, the Applicant believes that the high contact angle between the molten sodium and the fibres, and the surface tension of the sodium, combine to resist any such drainage under gravity, and to hold the molten layer in tight, close contact with the tube surface over the full extent thereof, as a layer of uniform thickness. As the cell is discharged and sodium passes through the separator into the interior of the separator tube, the fibres tend to repel the molten sodium and keep it in close contact with the tube, being aided in this regard by pressure in the pores between the fibres surrounding the layer, provided by the inert gas mentioned above.

The need for wicking of molten sodium upwardly over the tube surface, to combat drainage under gravity, is entirely avoided, and height constraints set by wicking height limits pose no problem. Furthermore, as the lining holds the molten anode material against the separator surface as a layer of uniform thickness, such cells can conveniently be loaded in the discharge state with no sodium in the anode compartment. As soon as they are charged, such sodium appears on the separator surface in the anode compartment but is prevented from draining under gravity, the whole of the separator surface being wetted thereby and being available for ion conduction.

The invention also extends, in the operation of a rechargeable high temperature electrochemical power storage cell having a molten alkali metal anode and a cathode separated from the anode by a ceramic solid electrolyte separator which is a conductor of ions of the anode metal, a method of promoting reliable contact between the alkali metal of the anode and the whole of the surface of the separator which is exposed to said alkali metal, and reliable wetting of the whole of said surface by said alkali metal over the whole of each charge/discharge cycle of the cell, which method comprises lining said surface of the separator with a lining of material which is porous to and permeable by the alkali metal of the anode, the molten alkali metal of the anode, when in contact with the surface of the material of the lining, exhibiting a contact angle of at least 90° with respect to the surface of the lining material.

The method may further comprise exposing the molten alkali metal of the anode to an inert gas under pressure to urge the alkali metal against the separator.

The invention will now be described, by way of example, with reference to the accompanying diagrammatic drawing, in which the single FIGURE shows a schematic sectional side elevation of a cell in accordance with the present invention.

In the drawing, reference numeral 10 generally designates an electrochemical cell in accordance with the invention. The cell 10 has a molten sodium active anode material 12 (whose boundary is shown in broken lines), a sodium aluminum chloride molten salt electrolyte 14, and a cathode 16 which is immersed in the electrolyte 14 and which in its discharged state comprises an electrolyte-permeable porous iron matrix which is electronically conductive and contains $FeCl_2$ in dispersed form therein as its charged active cathode substance.

Instead, the matrix could for example be of porous nickel containing $NiCl_2$ in dispersed form as its charged active cathode substance. The matrix of the cathode 16 is saturated with the electrolyte 14 and has sufficient finely divided NaCl dispersed therein to ensure that, in all states of charge of the active cathode substance, the electrolyte 14 is an equimolar mix of NaCl and $AlCl_3$, ie stoichiometrically exact $NaAlCl_4$.

The cell 10 has a mild steel outer housing or casing 18 having a base 20 for supporting it in an upright attitude, as shown. The casing 18 is sealed to an alpha-alumina insulating ring 22. An open-ended beta''-alumina separator tube 24 is located concentrically within the casing 18, the lower end of the tube 24 being closed and the upper or open end of the tube 24 being glass-welded to the alpha-alumina ring 22 in sealing fashion. The open end of the tube 24 is closed by a closure disc 26 of mild steel, sealed to the alpha-alumina ring 22. An anode terminal post 28 is welded to the casing 18, and a cathode terminal post 30 passes through a sealed central opening in the disc 26, downwardly into the electrolyte 14. The lower portion of the post 30 is embedded in and in electronic contact with the matrix of the cathode 16. The matrix acts as a cathode current collector. There is an inert gas space 32 above the electrolyte 14.

The space between the casing 18 and tube 24, occupied by the sodium 12, forms an anode compartment, and the interior of the tube 24 forms a cathode compartment. These compartments are separated from each other by the separator tube 24, and by the sealing of the tube 24, casing 18 and disc 26 to the alpha-alumina ring 22.

The anode compartment, between the casing 18 and tube 24, is shown filled with alpha-alumina flock fibres 36 having a diameter of 2 to 3 microns, and a percentage porosity of 97.75%. A steel mesh current collector 34 is shown tightly wrapped around the exterior of the tube 24, and extending upwardly into contact with the metal ring which forms the part of the casing 18 which is connected to the ring 22 and which carries the post 28. The collector 34 is shown in the drawing by crosses on the outer surface of the tube 24.

The overall charge/discharge reaction of the cell can be represented by the reaction:

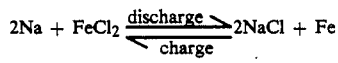

$$2Na + FeCl_2 \underset{charge}{\overset{discharge}{\rightleftarrows}} 2NaCl + Fe$$

Accordingly, sodium passes from the cathode compartment to the anode compartment during charging, through the separator 24; and it passes in the opposite direction during discharging. During discharging, the volume of the Fe/FeCl$_2$ active cathode substance increases, with a rise in the level of electrolyte 14 in the cathode compartment and a corresponding reduction in the volume of molten sodium active anode substance 12 in the anode compartment; and, upon charging, there is an increase in the volume of active molten sodium anode substance 12 in the anode compartment, with a corresponding drop in the level of molten electrolyte 14, arising from a decrease in the volume of the Fe/FeCl$_2$ active cathode substance.

If, as contemplated by the present invention, the cell is loaded in a discharged state, with no molten sodium 12 in the anode compartment, and with the cathode compartment containing a mixture of iron and NaCl in finally dispersed particulate form and saturated with the molten salt electrolyte 14, then initial charging of the cell will cause sodium, as described above, to pass outwardly through the tube 24 into the cathode compartment, the sodium passing through the tube 24 in ionic form, and receiving electrons from the external circuit via the current collector 34 which is attached to the housing 18 and post 28.

In accordance with the present invention, the current collector 34 is uniformly and tightly wrapped around the tube 24, giving rise to the formation of the layer of sodium 12 on the outside of the tube 24 of more or less uniform thickness. Droplets of sodium will initially form at the sites where the collector 34 is in contact with the tube, and will coalesce into the layer of sodium.

With particular reference to the alpha-alumina flocks 36, these flocks exhibit a relatively high contact angle with molten sodium, and are relatively poorly wetted by molten sodium, when compared eg with transition metals such as nickel or iron. The sodium 12 which is generated on the outside of the tube 24 during charging will force its way into the porous spaces between the flocks 36, but said alpha-alumina flocks will tend to repel the sodium, and tend to push it toward the surface of the tube 24. This applies when the anode compartment is loaded at a sub-atmospheric pressure, being eg evacuated after loading of the alpha-alumina flocks therein; but this also applies when said cathode compartment is loaded under pressure. Gas pressure between the alpha-alumina flocks will also tend to urge the sodium layer towards the surface of the tube 24. This gas will typically be inert, eg argon.

Upon discharging of the cell, the layer of sodium 12 simply becomes thinner, until, when the cell is fully discharged, all the sodium 12 has passed through the separator 24 into the cathode compartment.

Surprisingly, use of the poorly wettable alpha-alumina flocks has been found to keep the layer of sodium 12 in close contact with the outside of the tube 24, as a layer of more or less uniform thickness, and, more surprisingly, there is no tendency for said layer 12 to drain down the tube 24 under gravity, to collect in a pool at the bottom of the housing 18. In this regard it should be noted that cells of the type shown in the drawing were operated vertically, ie with the central or polar axes of the housing 18 and tube 24 substantially vertical, which would normally promote such drainage.

The invention accordingly has the advantage, compared with similar cells where sodium drains from the tube surface, that height constraints for wicking do not limit the tube length.

It should also be noted that the invention applies equally when the cell is loaded in an overdischarged state and initially also contains aluminium metal in the cathode compartment; and applies also to sodium/sulphur cells loaded in the discharged state, where sodium sulphide or polysulphide is loaded into the cathode compartment, with no sodium in the anode compartment.

It should further be noted, as a development of the invention, the other surface of the tube 24 in contact with the sodium may be treated to improve its wettability by the sodium: Thus, for example, the outer surface of the beta-alumina tube may be pre-treated by painting it with a paint comprising a suspension of fine iron powder in an anhydrous solution of ferric chloride in ethanol, containing 5–10% by mass ferric chloride. The fine iron particles may have a particle size of about 2 microns, and are available in Great Britain as Type C Carbonyl iron powder. This paint can be applied by brushing to the beta-alumina tubes, so that their outer surfaces, after drying, are covered by a continuous layer of the iron particles. Drying at about 100° C. for about ½ hour evaporates the alcohol solvent, and the ferric chloride reacts chemically with the beta-alumina and with the iron powder to form an adherent coating which comprises iron and possibly some ferric chloride and/or iron oxide, which will be reduced to iron on contact with the sodium of the anode. The steel mesh current collector 34 will then be tightly wrapped around the coated exterior of the tube 24. These features improve electronic contact of the current collector and/or sodium of the anode compartment with the beta-alumina tube, and the enhanced wettability of the beta-alumina tube assists the alpha-alumina flocks in keeping the sodium of the anode in contact with said tube.

The Applicant has conducted tests with test cells of the general construction shown in the drawing, but with the electrolyte 12 and cathode 16 is replaced by molten sodium; and the current collector 34 and flocks 36 replaced by a carbon beads. The beads had a size range of 50–350 microns and a vibrated density (tap density) of 1.87 g/cm$^3$, and were obtained as grade S 2607 solid carbon beads from Le Carbone-Lorraine, Gennevilliers, France. Molten sodium in contact therewith exhibited a high contact angle of more than 90°.

The tests comprised imposing an external potential on four test cells in each case to cause sodium to be transferred in ionic form through the tube 27 from the interior of the tube into the layer of beads. The imposed potential was then reversed to transfer sodium from the layer of beads through the tube 24 into the interior of the tube. During the transfer of sodium from the beads into the interior of the tube, the voltage and current were measured and the resistance of the cells was calculated from time to time according to the relation $$\text{Resistance} = \frac{\text{Voltage Imposed Across the Cell}}{\text{Current Passing Through the Cell}}$$

When resistance was measured, the amount of the sodium returned from the beads via the separator to the interior of the tube was recorded, as a percentage of the sodium originally transferred from the tube interior into the layer of beads. This was done by measuring the amount of electricity in coulombs passing through the cell in each direction. The test stopped when transfer of sodium into the tube interior ceased. Results are set out in the following table, Table 1:

TABLE 1

| Proportion of Sodium returned to Tube Interiors (%) | Cell No. | | | |
|---|---|---|---|---|
| | 1 Resistance (m-ohms) | 2 Resistance (m-ohms) | 3 Resistance (m-ohms) | 4 Resistance (m-ohms) |
| 1.4 | 9.1 | 11.4 | 9.1 | 8.0 |
| 35.5 | 9.7 | 9.6 | 8.2 | 8.2 |
| 53.3 | 9.96 | 9.3 | 8.2 | 8.2 |
| 71.1 | 10.0 | 9.2 | 8.2 | 8.2 |
| 75.5 | 10.0 | 9.2 | 8.2 | 8.2 |
| 83.7 | Sodium Transfer Ceased | | | |

The results in Table 1 were obtained employing a current of 2.5A to transfer sodium out of the tubes and a current of 8A to return it into the tube interiors, at a temperature of about 290° C. Table 1 shows that up to 75.5% of the sodium in the layer of beads can be returned to the interiors of the tubes at substantially constant cell resistance, after which the resistance rose to an extent that sodium transfer into the tubes ceased after 83.7% thereof had been returned to the tube interiors.

Further tests were conducted in these cells but with a current of 30A used instead of 8A, to return the sodium to the tube interiors. Temperature was increased from a minimum of about 290° C. at the start of the return of the sodium from the layers of beads to the tube interiors, up to about 370° C., when discharge stopped. Results are set out in the following table, Table 2:

TABLE 2

| Proportion of sodium returned to tube interiors % | Cell No. | | | | | | | |
|---|---|---|---|---|---|---|---|---|
| | 1 Resistance- Temperature | | 2 Resistance- Temperature | | 3 Resistance- Temperature | | 4 Resistance- Temperature | |
| | (m-ohm) | (°C.) | (m-ohm) | (°C.) | (m-ohm) | (°C.) | (m-ohm) | (°C.) |
| 1.4 | 8.6 | 290 | 12.3 | 296 | 12.2 | 296 | 7.9 | 301 |
| 44.4 | 6.0 | 346 | 6.0 | 341 | 5.8 | 342 | 6.1 | 340 |
| 71.1 | 5.1 | 364 | 5.2 | 362 | 5.1 | 362 | 5.5 | 361 |
| 82.2 | 5.1 | 372 | 9.0 | 362–372 | 5.0 | 363 | 5.3 | 362–372 |
| 83.7 | Sodium Transfer Ceased | | | | | | | |

Table 2 demonstrates that the anode compartment design using the beads was capable of sustaining a high discharge current in a rechargeable cell. The 30A current used corresponded to a current density of 150 mA/cm$^2$ for the tubes 24 employed. Once again sodium transfer ceased when 83.7% of the sodium had been returned to the tube interiors. As is usual with solid electrolytes, such as beta-alumina, the contribution to cell resistance caused thereby dropped as the temperature increased.

The test whose results are shown in Table 1 for the first transfer cycle of sodium from the tube interiors into the beads and back into the tube interiors was continued for 25 such cycles. Results for the 25th cycle are shown in the following table, Table 3:

TABLE 3

| Proportion of sodium returned to Tube Interiors (%) | Cell No. | | | |
|---|---|---|---|---|
| | 1 Resistance (m-ohms) | 2 Resistance (m-ohms) | 3 Resistance (m-ohms) | 4 Resistance (m-ohms) |
| 1.4 | 7.7 | 15.9 | 12.5 | 9.1 |
| 34.0 | 7.75 | 9.3 | 9.6 | 9.5 |
| 82.6 | 7.87 | 9.3 | 11.6 | 9.5 |

This test illustrated that the anode compartment design using the beads was capable of stable operation for up to 25 cycles, at which stage low cell resistances were still obtained after 82.6% of the sodium had been returned to the tube interiors.

As the ability to permit a high proportion of rechargeable electrochemical cell molten alkali metal anode material such as sodium to pass from the anode through the separators of such cells at high discharge currents with low cell internal resistance is important, the above tests show that the present invention meets this criterion at least as far as the contribution of the anode and separator are concerned.

Finally, it should be noted that an easy way of determining whether or not an alkali metal such as sodium, when molten, exhibits a contact angle of at least 90° with respect to the surface of the lining material, is by testing the wicking ability thereof in a packed column with regard to the molten alkali metal. Thus, a suitable glass tube can be packed with the lining material and can be arranged vertically with its lower end dipping in the molten alkali metal. In contrast to wicking materials which in this situation would raise the level of the molten alkali metal surface or meniscus in the tube to above the metal surface outside the tube, suitable lining materials for the present invention will, on the contrary, exhibit anti-wicking properties and will indeed depress the level of the molten alkali metal surface or meniscus in the tube to a level below that of the surface of the molten alkali metal surface outside the tube. When the contact angle is 90°, there will be no wicking or antiwicking, and the alkali metal surface level inside and outside the tube will be substantially the same. Naturally, any tube used for this test should have a diameter (eg at least 20 mm) sufficient for any wicking or antiwicking tendency of the walls of the tube to have a negligible effect on the level of the alkali metal surface or meniscus in the tube remote from said walls.

I claim:

1. A rechargeable high temperature electrochemical power storage cell having a molten alkali metal anode and a cathode separated from the anode by a ceramic solid electrolyte separator which is a conductor of ions of the anode metal, the separator having, in contact with its surface exposed to the alkali metal of the anode, a lining of material which is porous to and permeable by the molten alkali metal of the anode, the molten alkali metal of the anode, when in contact with the surface of the material of the lining at the operating temperature of the cell, exhibiting a contact angle of at least 90° with respect to the surface of the lining material, said contact angle being such that any alkali metal passing through the separator during charging from a fully discharged state in which there is no sodium in contact with the lining, is held by the lining in contact with the surface of the separator exposed to the anode in the form of a layer of more or less uniform thickness which does not drain downwardly under gravity, regardless of the attitude or orientation of the cell.

2. A cell as claimed in claim 1, in which the lining is in the form of a layer of particulate material having a percentage porosity as defined herein of at least 80% and an average particle diameter of at most 15 microns.

3. A cell as claimed in claim 1, in which the lining material is electronically insulating, the cell including an anode current collector in the form of a mesh or screen of electronically conducting material which is permeable to the molten alkali metal of the anode and is in face-to-face contact at a multiplicity of positions with the surface of the separator having said lining, the current collector being embedded in the material of the lining.

4. A cell as claimed in claim 3, in which the lining is a layer of ceramic particles, the current collector being in the form of a metal mesh or screen.

5. A cell as claimed in claim 1, in which the lining is in the form of a layer of electronically conducting particulate material which functions as a current collector.

6. A cell as claimed in claim 5, in which the lining is in the form of a layer of carbon beads.

7. A cell as claimed in claim 1, in which the alkali metal of the anode is sodium, the separator being of beta-alumina or nasicon.

8. A cell as claimed in claim 1, in which the anode is located in an anode compartment which contains an inert gas under pressure, the inert gas having a pressure of at least 10 kPa when the cell is in its fully discharged state.

9. A cell as claimed in claim 1, in which the lining has a volume at least sufficient to absorb, in its porous interior, all the alkali metal of the anode when the cell is in its fully charged state.

10. In the operation of a rechargeable high temperature electrochemical power storage cell having a molten alkali metal anode and a cathode separated from the anode by a ceramic solid electrolyte separator which is a conductor of ions of the anode metal, a method of promoting reliable contact between the alkali metal of the anode and the whole surface of the separator which is exposed to said alkali metal, and reliable wetting of the whole of said surface by said alkali metal over the whole of each charge/discharge cycle of the cell, which method comprises lining said surface of the separator with a lining of material which is porous to and permeable by the alkali metal of the anode, the molten alkali metal of the anode, when in contact with the surface of the material of the lining at the operating temperature of the cell, exhibiting a contact angle of at least 90° with respect to the surface of the lining material, said contact angle being selected such that any alkali metal passing through the separator during charging from a fully discharged state in which there is no sodium in contact with the lining, is held by the lining in contact with the surface of the separator exposed to the anode in the form of a layer of more or less uniform thickness which does not drain downwardly under gravity, regardless of the attitude or orientation of the cell.

11. A method as claimed in claim 10, which comprises exposing the molten alkali metal of the anode to an inert gas under pressure to urge the alkali metal aginst the separator.

* * * * *